United States Patent [19]

Horning et al.

[11] Patent Number: 5,689,735
[45] Date of Patent: Nov. 18, 1997

[54] WATER-RESISTANT CAMERA

[75] Inventors: Randy E. Horning, LeRoy; John H. Alligood, Penfield, both of N.Y.

[73] Assignee: Eastman Kodak Company, Rochester, N.Y.

[21] Appl. No.: 781,765

[22] Filed: Jan. 10, 1997

[51] Int. Cl.$^6$ .................................................. G03B 17/08
[52] U.S. Cl. .................................... 396/29; 396/541
[58] Field of Search .................................. 396/6, 25, 26, 396/29, 440, 442, 535, 541

[56] References Cited

U.S. PATENT DOCUMENTS

| | | | |
|---|---|---|---|
| 3,687,037 | 8/1972 | Nerwin | 95/31 |
| 4,803,504 | 2/1989 | Maeno et al. | 396/29 |
| 5,394,213 | 2/1995 | Hazama et al. | 354/288 |

Primary Examiner—Howard B. Blankenship
Attorney, Agent, or Firm—Roger A. Fields

[57] ABSTRACT

A water-resistant camera comprising a main body part having a rear back frame opening across which successive sections of a filmstrip are moved to be exposed, a rear cover part lighttightly covering the backframe opening, and a water-resistant casing part spaced opposite the rear cover part, is characterized in that the main body part has spacer projections separate from the backframe opening for abutting one side of the rear cover part which faces the backframe opening, to maintain a film clearance space between the backframe opening and the one cover part side for movement of successive sections of the filmstrip across the backframe opening, and the rear cover part has support projections aligned with the spacer projections, on another side of the rear cover part which faces the water-resistant casing part, whereby when water pressure tends to press the water-resistant casing part inwardly toward the rear cover part the support projections will cooperate with the spacer projections to prevent the water-resistant casing part from pushing the rear cover part substantially into the film clearance space.

7 Claims, 3 Drawing Sheets

WATER-RESISTANT CAMERA

FIELD OF THE INVENTION

The invention relates generally to the field of photography, and in particular to water-resistant cameras such as a one-time-use camera.

BACKGROUND OF THE INVENTION

Film and cameras that are all in one, commonly referred to as single-use or one-time-use cameras, have become well known. Typically, the one-time-use camera is a simple point-and-shoot type comprising a rigid plastic, inner, main body part which supports a fixed-focus taking lens, a film metering mechanism with a rotatably supported metering sprocket, a manual film advance thumbwheel, a single-blade shutter, a manual shutter release button, a frame counter for indicating the number of exposures remaining for picture-taking, a direct see-through viewfinder, a film cartridge, and in some models a fixed electronic flash. A pair of substantially thin plastic front and rear cover parts house the main body part between them to complete the camera unit. The rear cover part connects to the main body part and/or to the front cover part to make the main body part light-tight. A decorative cardboard outer box contains the camera unit and has respective openings for the taking lens, the shutter release button, the film advance thumbwheel, the viewfinder, the frame counter, and a flash emission window for the electronic flash.

At the manufacturer, the main body part is loaded with the film cartridge and the front and rear cover parts are connected to the main body part and/or to the front cover part to complete the camera unit. Then, an exposed end of a supply spool in the main body part is rotated to factory prewind substantially the entire length of an unexposed filmstrip from the film cartridge onto the supply spool. Lastly, the outer box is placed on the camera unit.

During picture-taking, after the photographer takes a picture, he or she manually rotates the thumbwheel to rotate a film spool of the film cartridge to wind an exposed section of the filmstrip into the film cartridge. The rewinding movement of the filmstrip the equivalent of slightly more than one frame width rotates the metering sprocket to decrement the frame counter to its next lower-numbered setting and to pivot a metering lever into engagement with the thumbwheel to prevent further manual rotation of the thumbwheel. Manually depressing the shutter release button to take another picture pivots the metering lever out of engagement with the thumbwheel to permit renewed rotation of the thumbwheel. When the maximum number of exposures available on the filmstrip are exposed and the filmstrip is completely rewound into the film cartridge, the one-time-use camera is given to a photofinisher who tears the outer box off the camera unit, separates the rear cover part from the main body part, and removes the film cartridge with the filmstrip from the main body part. Then, he removes the filmstrip from the film cartridge to develop the negatives and make prints for the customer, and he forwards the used camera parts to the manufacturer for recycling, i.e. remanufacture.

More recently, underwater one-time-use cameras have been commercialized which generally comprise a substantially thin water-resistant casing and a camera unit contained in the water-resistant casing. A problem that might occur with these simple inexpensive underwater cameras is that at certain underwater depths the water pressure will tend to flex or press the water-resistant casing inwardly toward or against the rear cover part of the camera unit, possibly resulting in some constriction between the rear cover part and the main body part that may inhibit film movement across the backframe opening.

SUMMARY OF THE INVENTION

Generally speaking, a water-resistant camera comprising a main body part and a rear cover part having a film clearance space between them to permit movement of successive sections of a filmstrip across a backframe opening in the main body part, and a water-resistant casing part spaced opposite the rear cover part, is characterized in that:

the rear cover part has respective support means located on a particular side of the rear cover part that faces the water-resistant casing part and are aligned with discrete raised portions of the main body part bordering the film clearance space, for cooperating with the raised portions to prevent the water-resistant casing part from pushing the rear cover part substantially into the film clearance space when water pressure tends to press the water-resistant casing part inwardly toward the rear cover part.

More specifically, a water-resistant camera comprising a main body part having a rear back frame opening across which successive sections of a filmstrip are moved to be exposed, a rear cover part lighttightly covering the backframe opening, and a water-resistant casing part spaced opposite the rear cover part, is characterized in that:

the main body part has spacer projections separate from the backframe opening for abutting one side of the rear cover part which faces the backframe opening, to maintain a film clearance space between the backframe opening and the one cover part side for movement of successive sections of the filmstrip across the backframe opening; and the rear cover part has support projections aligned with the spacer projections, on another side of the rear cover part which faces the water-resistant casing part, whereby when water pressure tends to press the water-resistant casing part inwardly toward the rear cover part the support projections will cooperate with the spacer projections to prevent the water-resistant casing part from pushing the rear cover part substantially into the film clearance space.

DETAILED DESCRIPTION OF THE INVENTION

The invention is disclosed as being embodied preferably in a water-resistant one-time-use camera. Because the features of a water-resistant one-time-use camera are generally known, the description which follows is directed in particular only to those elements forming part of or cooperating directly with the disclosed embodiment. It is to be understood, however, that other elements may take various forms known to a person of ordinary skill in the art.

Figure 1:
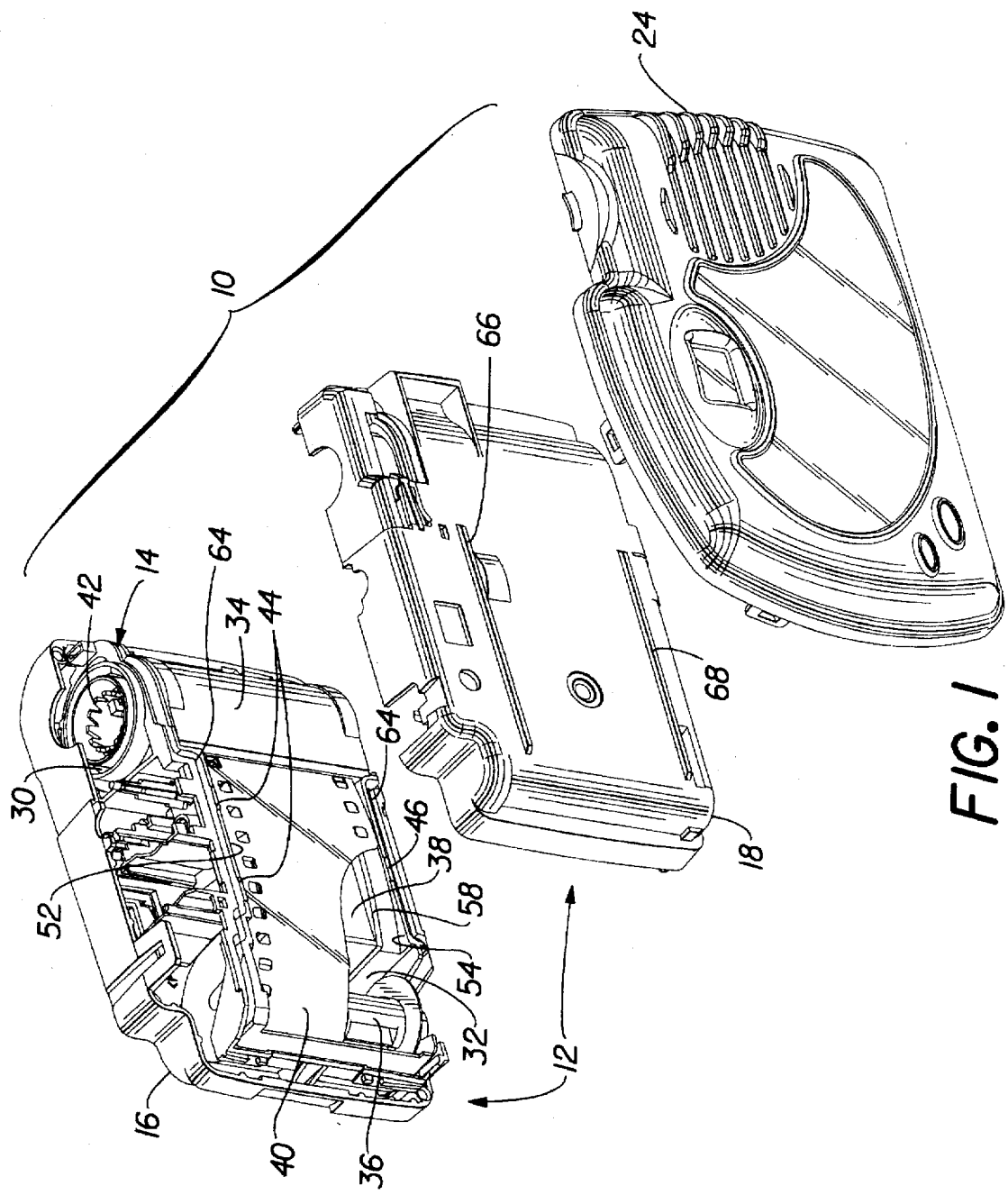
FIG. 1 is a rear exploded perspective view of a water-resistant one-time-use camera according to a preferred embodiment of the invention.
Figure 2:
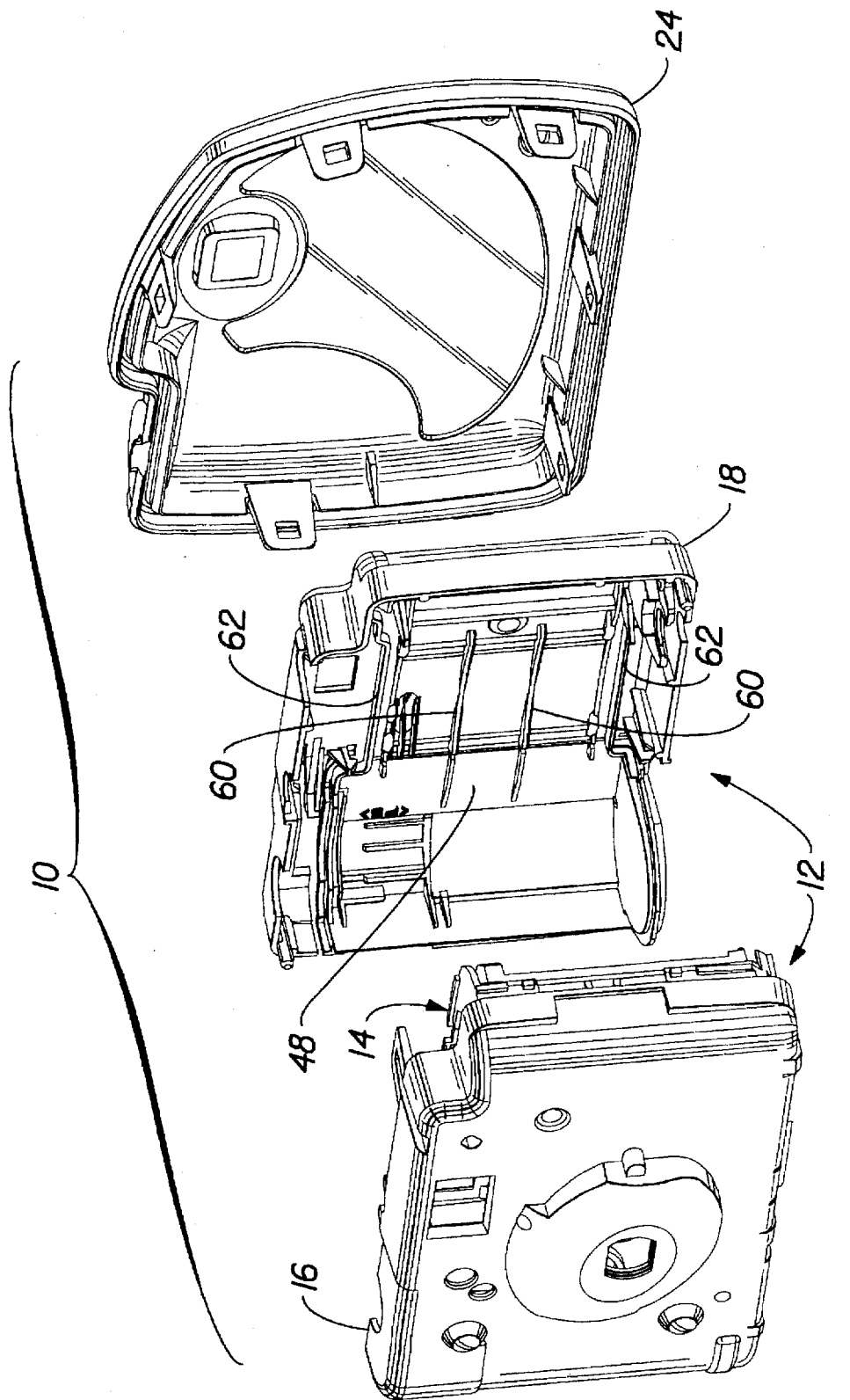
FIG. 2 is a front exploded perspective view of the water-resistant one-time-use camera.
Figure 3:
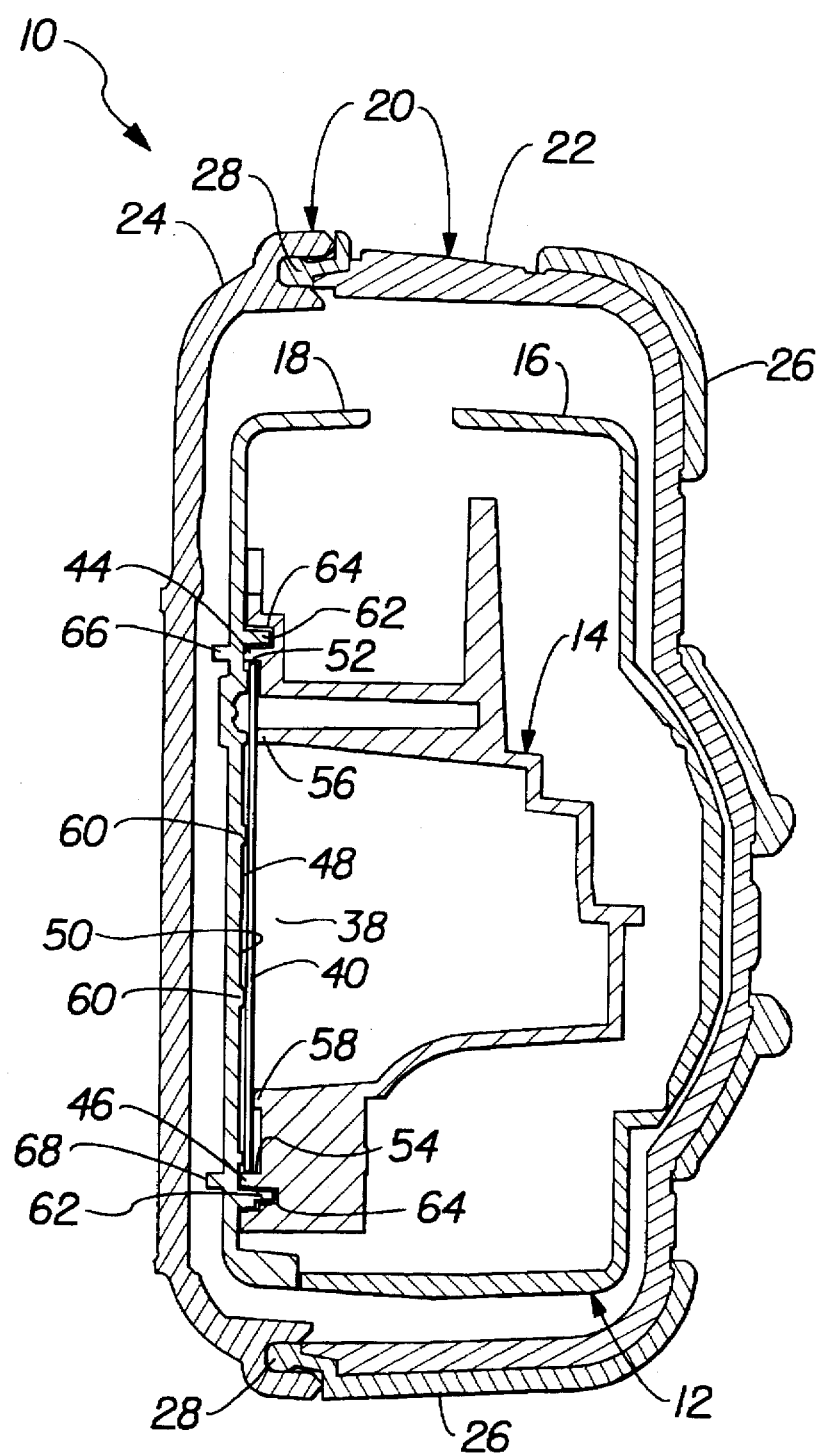
FIG. 3 is a side elevation section view of the water-resistant one-time-use camera.

Referring now to the drawings, FIGS. 1–3 show a water-resistant one-time-use camera 10 comprising an opaque-plastic interior camera unit 12 having a rigid main body part 14 and a pair of substantially thin front and rear cover parts 16 and 18 which connect to one another to form a camera housing which houses the main body part in order to complete the camera unit, and an exterior water-resistant casing 20 having a pair of substantially thin transparent-plastic front and rear casing parts 22 and 24 which connect to one another to contain the camera unit and a rubber overlay 26 on the front casing part which includes an endless sealing bead 28 that fits between the front and rear casing parts as shown in FIG. 3.

The main body part 14 is adapted to be nested in the front cover part 16, and the rear cover part 18 is intended to be fitted to the main body part to make the main body part light-tight. As shown in FIG. 1, the main body part 14 has integral cartridge-receiving and film roll chambers 30 and 32 for a light-tight film cartridge 34 and a film supply spool 36. The chambers 30 and 32 are located at opposite sides of a rear backframe or film exposure opening 38 at which successive sections of a filmstrip 40 are exposed during picture-taking. The successive film sections are moved from an unexposed film roll (not shown) on the spool 36, to the backframe opening 38 and, thence, into the cartridge 34 by manually rotating an exterior thumbwheel (not shown) in winding engagement with a spool 42 inside the cartridge. See FIG. 1.

As shown in FIG. 1 and 3, the main body part 14 has an integral pair of relatively short, rigid, upper spacer projections or pads 44 and a single, similar, lower spacer projection or pad 46, separate from but close to the backframe opening 38, which are slightly spaced from an inner side 48 of the rear cover part 18 to be able to abut the inner cover part side in order to maintain a film clearance space 50 between the backframe opening and the inner cover side for movement of successive sections of the filmstrip 40 across the backframe opening. The pair of upper spacer projections 44 and the single lower spacer projection 46 have respective right-angled sides that coincide with parallel, longitudinal film edge guides 52 and 54 on the main body part 14. The two film edge guides 52 and 54 and the three spacer projections 44 and 46 border the film clearance space 50.

As shown in FIG. 1 and 3, the main body part 14 has a pair of curved film rails 56 and 58 between the backframe opening 38 and the three spacer projections 44 and 46 to support successive sections of the filmstrip 40 in a curved film plane at the film clearance space 50. The inner side 48 of the rear cover part 18 has a pair of parallel, curved film guide ribs 60 facing the backframe opening 38 to hold successive sections of the filmstrip 40 in the curved film plane at the film clearance space 50. The main body part 14 and the inner cover part side 48 have interlocking light-trapping ribs 62 and grooves 64 separate from the film clearance space 50.

The rear cover part 18 has a pair of parallel upper and lower support projections or ribs 66 and 68 on an outer side 70 of the rear cover part which face the rear water-resistant casing part 24 as shown in FIG. 1. The respective upper and lower support ribs 66 and 68 are aligned with the pair of upper spacer projections 44 and the single lower spacer projection 46 as shown in FIG. 3. Accordingly, when water pressure or other pressure, such as hand pressure, tends to press or flex the rear water-resistant casing part 24 inwardly toward the rear cover part 18 the upper and lower support ribs 66 and 68 will cooperate with the upper and lower spacer projections 44 and 46 to prevent the rear water-resistant casing part from pushing the rear cover part into the film clearance space 50 to interfere with film movement.

The invention has been described with reference to a preferred embodiment. However, it will be appreciated that variations and modifications can be effected by a person of ordinary skill in the art without departing from the scope of the invention.

PARTS LIST 10. water-resistant camera
12. camera unit
14. main body part
16. front cover part
18. rear cover part
20. water-resistant casing
22. front casing part
24. rear casing part
26. rubber overlay
28. endless sealing band
30. cartridge-receiving chamber
32. film roll cheer
34. film cartridge
36. film supply spool
38. backframe opening
40. filmstrip
42. cartridge spool
44. pair of upper spacer projections
46. lower spacer projection
48. inner cover side
50. film clearance space
52. longitudinal film edge guide
54. longitudinal film edge guide
56. curved film rail
58. curved film rail
60. pair of curved film guide ribs
62. light-trapping ribs
64. light-trapping grooves
66. support rib
68. support rib
70. outer side of 18

We claim:

1. A water-resistant camera comprising a main body part and a rear cover part having a film clearance space between them to permit movement of successive sections of a filmstrip across a backframe opening in said main body part, and a water-resistant casing part spaced opposite said rear cover part, is characterized in that:

said rear cover part has respective support means located on a particular side of the rear cover part that faces said water-resistant casing part and are aligned with discrete raised portions of said main body part bordering said film clearance space, for cooperating with said raised portions to prevent the water-resistant casing part from pushing the rear cover part substantially into the film clearance space when water pressure tends to press the water-resistant casing part inwardly toward the rear cover part.

2. A water-resistant camera comprising a main body part having a rear back frame opening across which successive sections of a filmstrip are moved to be exposed, a rear cover part lighttightly covering said backframe opening, and a water-resistant casing part spaced opposite said rear cover part, is characterized in that:

said main body part has spacer projections separate from said backframe opening for abutting one side of said rear cover part which faces the backframe opening, to maintain a film clearance space between the backframe opening and the one cover part side for movement of successive sections of the filmstrip across the backframe opening; and said rear cover part has support projections aligned with said spacer projections, on another side of the rear cover part which faces said water-resistant casing part, whereby when water pressure tends to press said water-resistant casing part inwardly toward said rear cover part said support projections will cooperate with said spacer projections to prevent the water-resistant casing part from pushing the rear cover part substantially into said film clearance space.

3. A water-resistant camera as recited in claim 2, wherein said one cover part side has curved film guide ribs facing said backframe opening to form successive sections of the filmstrip into a curved film plane at said film clearance space.

4. A water-resistant camera as recited in claim 3, wherein said main body part has curved film rails between said backframe opening and said spacer projections to support successive sections of the filmstrip in the curved film plane.

5. A water-resistant camera as recited in claim 2, wherein said main body part and said one cover side have interlocking light-trapping ribs and grooves separate from said clearance space.

6. A water-resistant camera as recited in claim 2, wherein said spacer projections are relatively short rigid pads integral with said main body part, and said support projections are relatively long ribs integral with said cover part.

7. A water-resistant camera as recited in claim 2, wherein said spacer projections have respective right-angled sides that coincide with longitudinal film edge guides on said main body part which border said film clearance space.

* * * * *